Dec. 13, 1927.                                          1,652,244
H. W. F. IRELAND
TEMPERATURE INDICATOR SUITABLE FOR USE UPON OR IN CONNECTION WITH
THE RADIATORS OR INTERNAL-COMBUSTION ENGINES OF AUTOMOBILES
Filed July 28, 1925
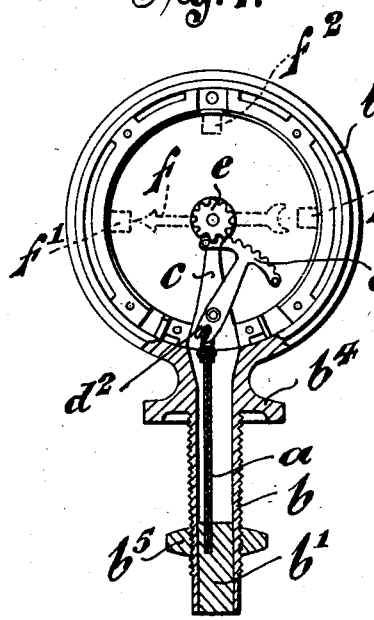
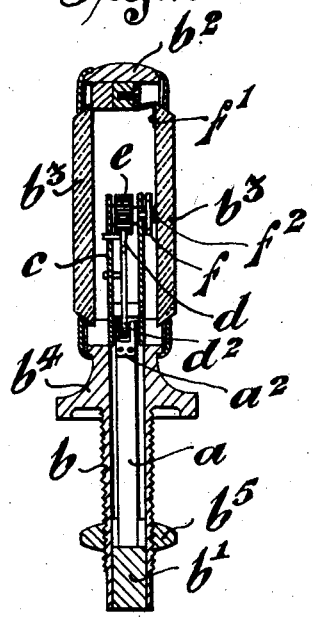
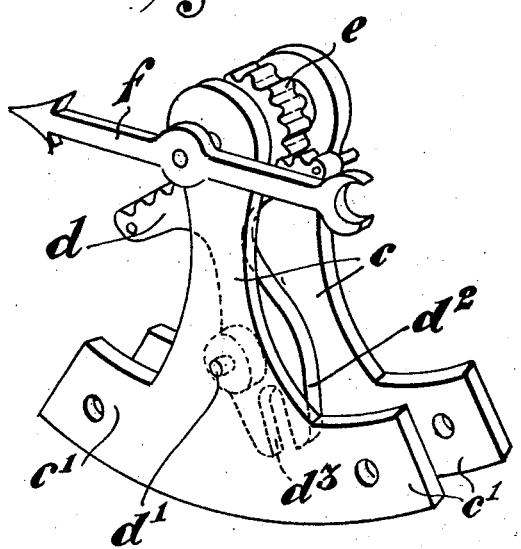
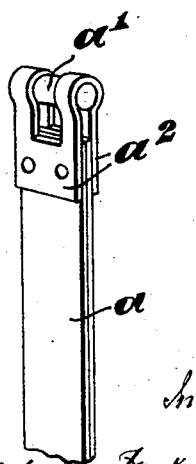

Patented Dec. 13, 1927.

1,652,244

UNITED STATES PATENT OFFICE.

HAROLD WILLIAM FRANK IRELAND, OF BIRMINGHAM, ENGLAND, ASSIGNOR TO CARL LOUIS BREEDEN, OF BIRMINGHAM, ENGLAND.

TEMPERATURE INDICATOR SUITABLE FOR USE UPON OR IN CONNECTION WITH THE RADIATORS OR INTERNAL-COMBUSTION ENGINES OF AUTOMOBILES.

Application filed July 28, 1925, Serial No. 46,545, and in Great Britain October 31, 1924.

The present invention has relation to a temperature indicator suitable for use upon or in connection with the radiators or internal-combustion engines of automobiles, the invention having for its object to provide such a device which is of simple construction, particularly efficient in operation, and which when used upon an automobile will clearly indicate to the driver or user the temperature existing as for instance in the air or vapour space above the water in the radiator, or the actual temperature of the water in the radiator, or the temperature of the engine, such as that of the water in any part of the cooling system. With this apparatus, when used as aforesaid, any overheating or insufficient heating, or any other variation from the normal is readily conveyed to the driver.

According to the present invention I provide a temperature indicator comprising in combination, a bi-metallic strip, the metals of which have differing co-efficients of expansion, a housing or frame therefor adapted to secure the strip at its one extremity, a toothed segment pivoted within the housing or frame having a slotted extension of itself slidably cooperating with the other or free extremity of the said strip and a pinion meshing with said segment and connected to an index finger.

The free extremity of the strip may carry a transverse pin which slidably cooperates with the slotted extension of the toothed segment, and the said toothed segment and pinion may be mounted within a bracket comprising two parallel plates attached to the main frame or housing.

In order that this invention may be clearly understood and readily carried into practice, reference may be had to the appended explanatory sheet of drawings, upon which :—

Figure 1 is a sectional elevation of a temperature indicator constructed according to the present invention.

Figure 2 is a sectional side or edge elevation of the indicator shown in Figure 1.

Figures 3 and 4 illustrate in perspective component parts of the device hereinafter referred to.

In a convenient embodiment of the present invention the bi-metallic strip or bar $a$ comprises two oblong strips of metal having differing co-efficients of expansion such as iron and brass or copper and steel, and which are secured together superficially in such a manner that when subjected to heat the strip or bar is automatically bent. This strip or bar $a$ is secured at its lower part to a plug $b^1$ in a tubular housing $b$, to the upper part of which latter a somewhat cylindrical housing $b^2$ is attached or combined, closed at front and rear by suitable glass discs $b^3$. The tubular housing $b$ may be adapted for attachment to the water cap of an automobile radiator as for instance by the flange $b^4$ and nut $b^5$ operating upon a screw thread, the top part of the cap being adapted to be clamped between the parts $b^4$, $b^5$. Mounted within the upper or cylindrical part of the device is a bracket $c$, (more particularly illustrated in Figure 3), comprising two plates adapted for attachment to the cylindrical body $b^2$, as for instance, by the part $c^1$. Between these plates $c$ a toothed segment $d$ is pivoted by axis pin $d^1$ and this segment has an extension $d^2$ slotted as at $d^3$ to engage the upper extremity of the bi-metallic strip $a$. For this purpose, the bi-metallic strip $a$ (see particularly Figure 4) carries at its upper extremity a transverse pin $a^1$ which may be secured, as for instance by a U-shaped strip $a^2$. The pin $a^1$ is adapted to slide within the slot $d^3$. Mounted between the plates $c$ is a pinion $e$ on the spindle of which a pointer or index finger $f$ is mounted.

In operation it will be seen that upon the bi-metallic strip $a$ becoming bent or flexed through the heat the segment $d$ is actuated, the pin $a^1$ slidably cooperating with the slot $d^3$ and the temperature or conditions obtaining in the so-called air-space above the water can be identified from the pointer $f$. The pointer $f$ may be adapted to rotate through half-a-circle and indications $f^1$ $f^2$ coloured as for example respectively white, green, and red may indicate to the driver the conditions as previously stated obtaining in the so-called air-space of the water radiator above the level of the water.

What I claim as my invention and desire to secure by Letters Patent is:—

1. A temperature indicator suitable for use upon or in connection with the radiator or other part of an internal combustion engine, comprising a tubular housing, an apertured cylindrical casing carried at the upper open end of said housing, a plug in the lower part of said housing, a bimetallic strip held in said plug and extending upwardly in said housing, a pin carried by said bimetallic strip, two narrow plates of inverted T-shape secured to said cylindrical casing and forming a bracket, a toothed segment pivotally mounted in said bracket and provided with a bifurcated extension freely engaging said pin, a pinion rotatably mounted in said bracket in mesh with said toothed segment, an index finger carried by said pinion, and two transparent disks forming the covers of said cylindrical casing.

2. A temperature indicator suitable for use upon or in connection with the radiator or other part of an internal combustion engine, comprising a tubular housing, an apertured cylindrical casing carried at the upper open end of said housing, a bimetallic strip secured in the lower part of said housing extending upwardly therein, an inverted U-shaped strip secured to the free end of said bimetallic strip and carrying a pin, a toothed segment pivotally mounted within said casing and having a slotted extension engaging said pin, a pinion rotatably mounted in said casing in mesh with said toothed segment, an index finger carried by said pinion, and two transparent discs forming the covers of said cylindrical casing.

In witness whereof I have hereunto set my hand.

HAROLD WILLIAM FRANK IRELAND.